(12) United States Patent
Moreira Da Silva et al.

(10) Patent No.: US 12,215,574 B2
(45) Date of Patent: Feb. 4, 2025

(54) SYSTEM AND METHOD FOR USE OF DESULPHATED INJECTION WATER FROM OFFSHORE PLATFORMS FOR UTILIZATION IN INHIBITION SQUEEZES

(71) Applicant: Petróleo Brasileiro S.A.—PETROBRAS, Rio de Janeiro (BR)

(72) Inventors: Fernando Antonio Moreira Da Silva, Rio de Janeiro (BR); Fabio Antonio Teixeira Saboia Filho, Macaé (BR); Rosane Alves Fontes, Petrópolis (BR); Stefan Suarez Ferreira, Santos (BR); Francisca Ferreira Do Rosário, Rio de Janeiro (BR); Patricia Braga Gusmão, Rio de Janeiro (BR); Paulo Henrique De Amorim Martins, Rio de Janeiro (BR)

(73) Assignee: Petróleo Brasileiro S.A.—PETROBRAS, Rio de Janeiro (BR)

( * ) Notice: Subject to any disclaimer, the term of this patent is extended or adjusted under 35 U.S.C. 154(b) by 322 days.

(21) Appl. No.: 17/750,076

(22) Filed: May 20, 2022

(65) Prior Publication Data

US 2022/0372848 A1    Nov. 24, 2022

(30) Foreign Application Priority Data

May 21, 2021    (BR) ..................... 10 2021 009961 5

(51) Int. Cl.
*E21B 43/01*    (2006.01)
*C09K 8/72*    (2006.01)
(Continued)

(52) U.S. Cl.
CPC ............... *E21B 43/01* (2013.01); *C09K 8/72* (2013.01); *E21B 37/06* (2013.01); *E21B 43/20* (2013.01)

(58) Field of Classification Search
USPC ........................................................ 166/368
See application file for complete search history.

(56) References Cited

U.S. PATENT DOCUMENTS

| 5,671,813 A | * | 9/1997 | Lima | ...................... E21B 23/08 |
| | | | | 166/372 |
| 6,022,421 A | * | 2/2000 | Bath | ...................... B08B 9/055 |
| | | | | 15/104.062 |

(Continued)

FOREIGN PATENT DOCUMENTS

| WO | 2006/088372 A1 | 8/2006 |
| WO | 2007/024383 A2 | 3/2007 |
| WO | 2018/234559 A1 | 12/2018 |

*Primary Examiner* — Matthew R Buck
*Assistant Examiner* — Douglas S Wood
(74) *Attorney, Agent, or Firm* — ARENTFOX SCHIFF LLP

(57) ABSTRACT

The present invention provides a system and method for use of desulphated injection water from offshore platforms for utilization in inhibition squeeze operations. The system is capable of increasing the treatment capacity by joining the pumping system from the stimulation vessel with the water injection system from the offshore platform.

In the initial treatment step, according to the method of this invention, the fluid containing the inhibitor is pumped exclusively by the vessel, followed by an aqueous overflush, where the injection water is mixed with part of the inhibitor cushion pumped by the stimulation vessel.

8 Claims, 1 Drawing Sheet

(51) Int. Cl.
*E21B 37/06* (2006.01)
*E21B 43/20* (2006.01)

(56) References Cited

U.S. PATENT DOCUMENTS

| | | | |
|---|---|---|---|
| 2003/0145991 A1* | 8/2003 | Olsen | E21B 43/13 166/265 |
| 2009/0223672 A1* | 9/2009 | Naik | F16L 55/46 166/344 |
| 2012/0031621 A1* | 2/2012 | Fowler | F17D 1/17 703/1 |
| 2023/0127921 A1* | 4/2023 | Moreira Da Silva | C09K 8/528 166/304 |

\* cited by examiner

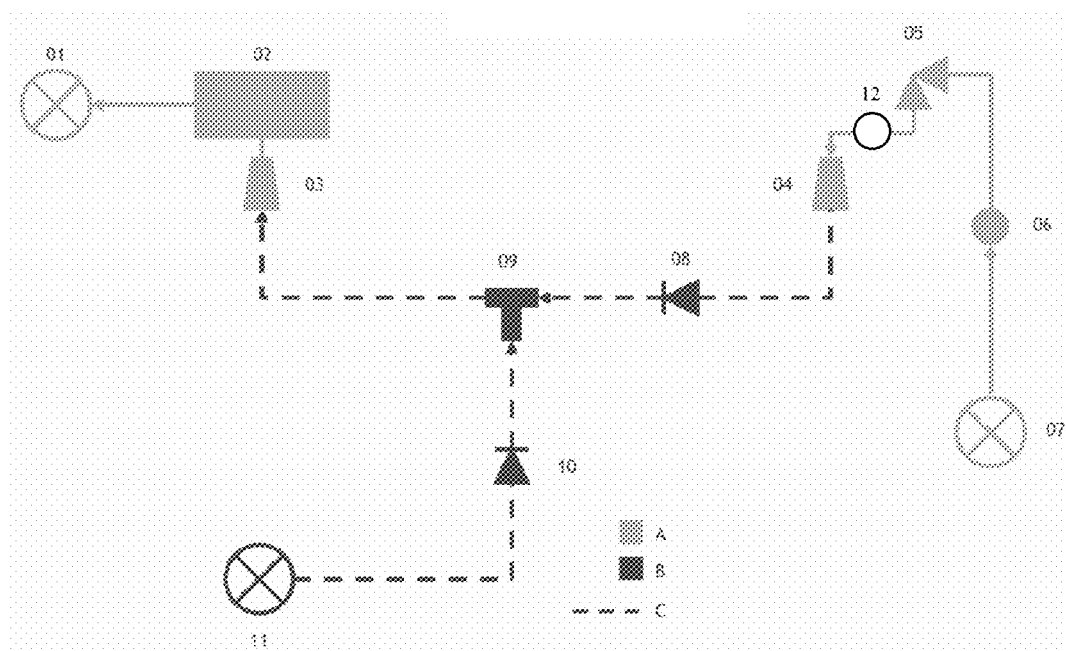

SYSTEM AND METHOD FOR USE OF DESULPHATED INJECTION WATER FROM OFFSHORE PLATFORMS FOR UTILIZATION IN INHIBITION SQUEEZES

CROSS REFERENCE TO RELATED APPLICATION(S)

This application claims priority to Brazilian Patent Application No. BR1020210099615 entitled "SYSTEM AND METHOD FOR USE OF DESULPHATED INJECTION WATER FROM OFFSHORE PLATFORMS FOR UTILIZATION IN INHIBITION SQUEEZES" and filed on May 21, 2021, the disclosure of which is incorporated herein in its entirety.

FIELD OF INVENTION

The present invention addresses to the field of activities of remote inhibition treatments in oil wells, and is based on the development of a solution to allow increasing the total volume of the treatment, in order to obtain a longer duration thereof, with a reduction in the number of annual interventions and well shutdowns.

DESCRIPTION OF THE STATE OF THE ART

Stimulation vessels are commonly used in oil well fouling inhibition operations. The ability to prepare aqueous solutions used in the treatment is limited by the availability of industrial water that can be transported by this type of vessel.

Remote inhibition treatments in wells with a high flow rate of water production (>1000 $m^3$/d) require treatments with a high invasion volume (>5,000 bbl (596.20 $m^3$)) to allow the minimum efficiency to be reached (duration of effectiveness of the inhibitor of fouling applied by squeeze of 6 months or more). When there is not enough industrial water volume, it is necessary to supplement the invasion with diesel, a comparatively much more expensive fluid.

One of the biggest problems involving the injection of seawater as a secondary oil recovery method is the formation of scale due to the precipitation of salts (scaling). In most reservoirs, the formation water contains alkaline cations such as calcium, strontium and barium. Divalent sulfate anions ($SO_4^{-2}$) present in seawater combine with these cations, forming precipitates. These precipitates are highly insoluble, especially barium sulfate, in addition to being sticky and difficult to remove mechanically. The accumulation of precipitates in the reservoir makes the flow of fluids difficult, compromising the productivity of the well.

In addition to problems related to scaling, the presence of sulfate can cause the growth of sulfate-reducing bacteria (SRB), which produce hydrogen sulfide ($H_2S$). $H_2S$ is an extremely toxic and corrosive agent and, when present, implies additional treatment steps in the processing of oil and natural gas, in addition to requiring the installation of additional safety systems. In this way, the presence of sulfate in seawater may result in numerous types of operational problems, in addition to increasing costs related to treatments.

The best option to minimize the damage caused by sulfate is its removal before the injection of seawater into the reservoir. The removal must be done in such a way that the sulfate ions are selectively removed, while the salinity of the injection water must be partially maintained to preserve the stability of the reservoir rock.

Laboratory studies carried out in this work enabled the use of desulphated water for the dilution of the inhibitor product. Thus, with the availability of desulphated injection water in a SPU, this can guarantee larger volumes of treatment with industrial water and diesel savings.

Document WO2018234559A1 discloses a system and a method of utilization of a barge for injection of seawater. The barge can be equipped with multiple modules to establish a readily available connection to "plug and produce" to hydrocarbon production equipment.

According to WO2018234559A1, the modules can be installed for processing and injection of seawater, support facilities, utilities, and piping, such as a flexible pipe around a pipe reel. The barge can be moved to a location, the pipe can be connected from the barge to the production equipment, and the barge can be moved a distance from the production equipment with the pipe to be deployed. The barge can be anchored to the seabed and does not need to be powered or have thrusters for positioning. The ballast can be attached along the flexible pipe to lower the flexible pipe to the sea floor to allow supplies and other vessels to pass safely therebetween.

Despite performing water injection, the document WO2018234559A1 is restricted to the supply of water only by the barge, limiting the volumetric capacity of the operation.

Document WO2007024383A2 discloses a method and a device associated with the production of hydrocarbons. The method describes the connection of several wells to a stimulation fluid pumping system via a pumping system manifold. The pumping system manifold is adjusted to provide a first flow path from the pumping system of stimulation fluid to a first well. Then, a first stimulation treatment is pumped into the first well. In parallel with the pumping of the first stimulation treatment, a second well is prepared for a second stimulation treatment.

Document WO2007024383A2 differs from the present invention for not employing the junction of the systems of pumping from the vessel and of water injection from the offshore platform.

Document WO2006088372A1 discloses a system and method of intervention in subsea oil and gas wells, comprising a surface vessel, or rig, with equipment for handling and controlling a connection string for downhole tools, and also a system for the supply and return of drilling fluid, from where the connection string for the downhole tool runs down in an actual drilling hole of a subsea well, and where a return line for drilling fluid runs up to said system on the surface vessel or the platform. The connecting string for downhole tools runs into the well without a riser or landing string being fitted, and a removable intervention valve is arranged in the drilling hole, to function as a temporary barrier.

Document WO2006088372A1 differs from this invention for not having a system that provides the junction of the systems of pumping from the vessel and of water injection from the offshore platform.

Given the limitations in the State of the Art as to solutions that require treatments with a high volume of invasion without the use of seawater, the need arose to develop a technology capable of presenting an effective performance and that is in accordance with the recommendations of standardization. The works cited in the State of the Art do not have the unique features that will be presented in detail below.

OBJECTIVES OF THE INVENTION

Increasing the treatment capacity in remote oil well fouling inhibition operations by increasing the total volume of treatment.

Allowing the union of the pumping system from the stimulation vessel, used in the inhibition operations, with the water injection system from the offshore platform.

BRIEF DESCRIPTION OF THE INVENTION

The present invention provides a system and method for using desulphated injection water from offshore platforms for utilization in inhibition squeeze operations. The system developed in this invention is capable of increasing the treatment capacity by joining the pumping system from the stimulation vessel with the water injection system from the offshore platform.

The method of the present invention is characterized initially by pumping the solution containing the inhibitor by the stimulation vessel. Then, the injection water from the SPU is mixed with part of the inhibitor cushion, thus having a considerable increase in the displacement volume, with a reduction in the use of industrial water.

BRIEF DESCRIPTION OF DRAWINGS

The present invention will be described in more detail below, with reference to the attached FIGURE which, in a schematic way and not limiting the inventive scope, represents an example of its embodiment. In the drawing, there is:

FIG. 1 illustrating the schematic design of the system of this invention, where there are represented: SPU Equipment (A), WSV (Well Stimulation Vessel) Equipment (B), Chicksan Lines (C), Producing Well (01), Pig Launcher/Receiver (02), WECO Fitting (03), WECO Fitting (04), Choke Valve (05), Water Flow Rate Meter (06), Desulphated Water Injection Header (07), Check Valve (08), T Fitting (09), Check Valve (10), Coflexip Support Fitting (11), Spool (12).

DETAILED DESCRIPTION OF THE INVENTION

The development of the system and method disclosed herein was due to the limitation of the volume of industrial water in inhibition operations with the use of stimulation vessel.

There follows below a detailed description of a preferred embodiment of the present invention, represented in FIG. 1, of an exemplary nature and in no way limiting. Nevertheless, it will be clear to a technician skilled on the subject, upon reading this description, possible further embodiments of the present invention still comprised by the essential and optional features below.

The system developed in this invention is applied during well inhibition squeeze operations, with the objective of enabling the replacement of part of the industrial water by seawater. This system allows the union of the pumping system from the stimulation vessel with the water injection system from the offshore platform. For a particular case, in which the system was applied, the spool built for the injection of reservoir acidification treatments was used, taking, through Chicksan lines (C), the injection water to the type T junction point (09) with the stimulation vessel fluid, then allowing the simultaneous injection of the two fluids with combined flow rates.

In the system in question, the use of desulphated water, supplied continuously on the platform to the injection wells, allows increasing the total volume of treatment, in addition to enabling the dilution of the inhibitor product solution sent by the stimulation vessel and expanding the displacement volume (called overflush) in order to obtain a longer duration of treatment.

The scale inhibitor to be used is evaluated in the laboratory prior to operation, to verify the compatibility with mixtures of inhibitor fluid and desulphated seawater.

The water injection system is interconnected by means of a WECO type fitting (04) and Chicksan lines (C) to a T fitting (09) formed by a set of valves. The presence of check valves (08 and 10) prevents overpressurization of both the water injection system and the fluid pumped from the vessel, preventing the return of fluid. The injection water flow rate is controlled by the flow rate meter (06) and by the choke valve (05) of the injection header (07) of the well, and the injection flow of the treatment cushion is controlled by the own pumping system from the stimulation vessel.

According to the method of the present invention, in the initial step of treatment injection, the vessel exclusively pumps the fluid containing the inhibitor. In the next step of aqueous overflush, the injection water is mixed with part of the inhibitor cushion pumped by the stimulation vessel, thus obtaining a considerable increase in the displacement volume.

The system and method of this invention allow reducing the cost of treatment and reducing the consumption of fuel oil (diesel) and industrial water. The increase in the displacement volume (overflush) allows for a longer duration of the inhibition treatment, with a reduction in the number of annual interventions and well shutdowns. The method of this invention can be applied in well inhibition operations with high production flow rate and high BSW.

The coupling of the pumping systems from the stimulation vessel and of water injection from the offshore platform, object of this invention, is composed of: a pig launcher/receiver (02) of the producing well (01), WECO fittings (03 and 04), a choke valve (05), a water flow rate meter (06), a desulphated water injection header (07), check valves (08 and 10), a T fitting (09), a Coflexip hose (11), and Chicksan lines (C).

In a particular case in which the system was used, the Coflexip support (11) is positioned on the port side of the Cellar Deck of the platform. There are two connection points from the Chicksan lines to the SPU lines: the pig launcher/receiver (02) of the producing well (01) and the spool (12) downstream of the choke valve (05) of the injection well, which are positioned on the starboard in the Spider Deck (a deck immediately below the Cellar Deck).

The invention claimed is:

1. A system for use of desulphated injection water from offshore platforms in inhibition squeezes, comprising:
   a producing well;
   a pig launcher or receiver upstream from the producing well;
   a first fitting upstream from the pig launcher or receiver;
   a T fitting upstream from the first fitting, the T fitting configured to receive inhibitor fluid and desulphated injection water;
   a first check valve and a second check valve respectively upstream from the T fitting;
   a hose upstream from the first check valve, the hose configured to provide the inhibitor fluid to the T fitting via the first check valve;
   a second fitting upstream from the second check valve;
   a choke valve upstream from the second fitting;
   a water flow rate meter upstream from the choke valve;
   a desulphated water injection header upstream from the water flow rate meter, the desulphated water injection header configured to provide the desulphated injection water to the T fitting via the water flow rate meter, the choke valve, the second fitting, and the second check valve; and lines respectively connecting the T fitting to the first fitting, the first check valve to the T fitting, the hose to the first check valve, the second check valve to the T fitting, and the second fitting to the second check valve.

2. The system for use of desulphated injection water from offshore platforms in inhibition squeezes according to claim 1, wherein the inhibitor fluid is pumped fluid from a stimulation vessel, the desulphated injection water is injected water from an offshore platform, and the T fitting is configured to provide a mixture of the pumped fluid and the injected water to the producing well via the first fitting and the pig launcher or receiver.

3. The system for use of desulphated injection water from offshore platforms in inhibition squeezes according to claim 1, further comprising:

a spool downstream from the choke valve for injection of acidification treatments.

4. The system for use of desulphated injection water from offshore platforms in inhibition squeezes according to claim 1, wherein the T fitting is configured to simultaneously receive the inhibitor fluid and the desulphated injection water at controlled flow rates.

5. The system for use of desulphated injection water from offshore platforms in inhibition squeezes according to claim 1, wherein the T fitting is formed by a set of valves.

6. The system for use of desulphated injection water from offshore platforms in inhibition squeezes according to claim 1, wherein the inhibitor fluid is pumped fluid from a vessel, the desulphated injection water is injected water from a water injection system, the first check valve is configured to prevent the pumped fluid from returning to the hose, and the second check valve is configured to prevent the injected water from returning to the water injection system, whereby the first check valve and the second check valve prevent overpressurization of both the water injection system and the pumped fluid from the vessel.

7. The system for use of desulphated injection water from offshore platforms in inhibition squeezes according to claim 1, wherein the water flow rate meter and the choke valve are configured to control an injection water flow rate of the desulphated injection water from the desulphated water injection header, and a treatment cushion injection flow of the inhibitor fluid is controlled by a pumping system of a stimulation vessel.

8. A method for use of desulphated injection water from offshore platforms in inhibition squeezes, using the system as defined in claim 1, wherein in an initial treatment step, the inhibitor fluid is pumped exclusively from a stimulation vessel to the producing well, followed by an aqueous overflush, where the desulphated injection water is mixed with part of an inhibitor cushion in the producing well.

* * * * *